April 27, 1965  H. R. ROTTMANN  3,180,994
METHOD AND APPARATUS FOR INSPECTING GLASS CONTAINERS
Filed Oct. 13, 1961  2 Sheets-Sheet 1

INVENTOR.
Hans R. Rottman
BY W. A. Schaich &
D. T. Jamias
ATTORNEYS

April 27, 1965    H. R. ROTTMANN    3,180,994
METHOD AND APPARATUS FOR INSPECTING GLASS CONTAINERS
Filed Oct. 13, 1961    2 Sheets-Sheet 2

INVENTOR.
Hans R. Rottmann
BY W. A. Schaich
J. T. Innis
ATTORNEYS

United States Patent Office 3,180,994
Patented Apr. 27, 1965

3,180,994
METHOD AND APPARATUS FOR INSPECTING GLASS CONTAINERS
Hans R. Rottmann, Toledo, Ohio, assignor to Owens-Illinois Glass Company, a corporation of Ohio
Filed Oct. 13, 1961, Ser. No. 144,872
7 Claims. (Cl. 250—222)

This invention relates to a method and apparatus for inspecting glass containers for defects, flaws or stuck glass in the bottom. The invention in the form herein illustrated is a particular design for inspecting glass jars such as are used for packaging food products and other commodities and is so described herein although it would be undertsood that the invention can be used for inspecting other containers or articles.

The invention provides a method and apparatus for scanning the interior bottom surface and heel of a jar or the like, with a light beam or beam of radiation for detecting projections of glass generally termed "spikes," fragments of glass which have loosely attached or fused to the bottom surface and heel or any other interior surface defect all of which are herein referred to as flaws or defects. Hereinafter reference to the "interior bottom surface" being inspected will also encompass the heel portion of the container.

I have found that if a sufficiently high concentration of light is projected on a spike, a fragment of glass or the like on the inner bottom surface of a glass jar, it will reflect a considerable amount of this light in many directions. I have further discovered that such projected light must strike the glass fragment or spike from the inside of the jar, that is, the light must approach the glass or defect from the interior of the jar and is directed outwardly from the jar in order to get the maximum reflection. One peculairity of this phenomenon is that the projected light can pass through one wall thickness of the glass before striking a flaw on the opposite wall, and the resultant reflection from the surface of such flaw is still maintained at a high level.

The present invention utilizes these principles in apparatus designed for inspecting glass jars or the like on a commercial scale, the apparatus being designed for testing the jars in rapid succession for discovering any surface defect on the inner bottom surface of a jar. The invention provides a method and apparatus for testing the inner bottom surface of a glass container by means of a light beam projecting in a downwardly inclined path.

In its preferred form the testing unit comprises a light source and lens system for projecting said light source onto the inner bottom surface of a jar. The beam of projected light, when striking the bottom of the container, is rectangular in shape with one end of the beam illuminating the center of the bottle and the other end of the rectangular beam illuminating a radially spaced sidewall portion of the container adjacent the bottom thereof. Therefore, the light is projected so as to illuminate a narrow radially extending strip of the inner bottom surface of the jar.

This projection of a slit of light onto the inner bottom surface while the bottle is rotated about its vertical axis will insure that one revolution of the bottle will allow the slit of light to sweep the entire inner bottom surface of the bottle.

When a spike or other flaw is present on the inner bottom surface, the beam of light will be reflected therefrom in more or less a scattered pattern. This reflected light is viewed by a photo-sensitive detector positioned above so that its field of view extends through the upper open end of the container being examined or inspected and encompasses the illuminated area of the inner bottom surface of the container. The photo-sensitive detector may be connected in a circuit similar to that disclosed in the patent to Fedorchak No. 2,593,127, issued April 15, 1952, to provide a visual signal or reject signal.

With the foregoing in mind it is an object of this invention to provide a method and apparatus for optically inspecting the inner bottom surfaces of containers for spikes, stuck glass or other surface defects.

It is an object of this invention to provide a method and apparatus for optically inspecting the bottom of transparent containers wherein the container bottom is compeltely inspected with one revolution of the container.

Other and further objects and advantages will be apparent from the detailed description taken in conjunction with the attached sheets of drawings wherein.

Figure 1:
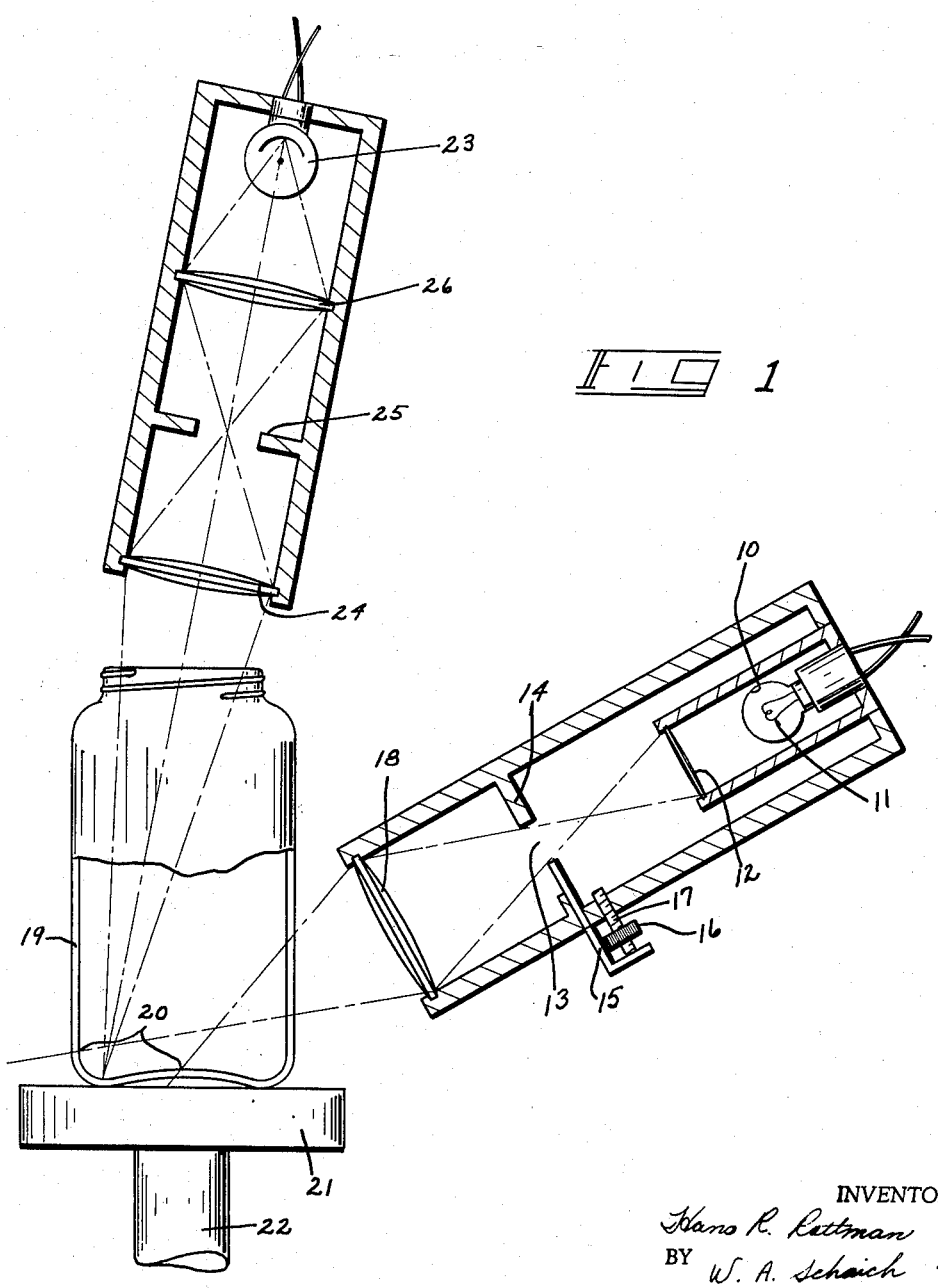
FIG. 1 is a schematic elevational view of the apparatus of the invention.

Referring now to the drawings, the inspection device comprises a source of radiation 10, which in this case may be a bulb having a filament 11. A converging lens 12 is mounted in front of the source 10 and will focus an image of the filament 11 on a rectangular slit 13 formed in a plate 14. The slit 13 is adjustable in length by a slidable plate 15 which is vertically shiftable by rotation of a thumb wheel 16 connected to a threaded shaft 17. The shaft 17 is threaded in the sidewall of the mounting tube for the source 10 and plate 14. A second converging lens 18 focuses an image of the slit on the bottom inner surface of the container 19. The length of the illuminated portion 20 on the inner bottom surface of the container is determined by the height of the slit 13. In this manner applicant may inspect containers of different diameters merely by shifting the position of the plate 15 with respect to the aperture plate 14. A container 19 rests on a rotatable table 21 having a diffused black surface. The table 21 is rotated by a shaft 22 connected to the center of the table 21. With this particular arrangement for illuminating a portion of the bottom surface of the container, one revolution of the container will effect illumination of the entire inner bottom surface thereof in successive increments. The beam from the source 10, after passing through the lens 18 passes through the vertical sidewall of the container and through the interior of the container. The focal point of lens 18 will be above the bottom of the container so that the illumination of the bottom of the container is an image of the slit 13. The angular relationship of the beam with respect to the bottom of the container will permit the light to normally pass through the bottom of the container without reflections of an intensity great enough to cause the detector to energize the reject mechanism.

Furthermore, stippling or other surface irregularities which may be present on the outer surface of the container near the heel or lower corner, will not cause disturbing reflections back into the interior of the container. In view of the fact that the slit 13 is adjustable with respect to its height the length of the area of illumination 20 may be adjusted depending on the diameter of the container being examined.

As can clearly be seen when viewing FIG. 1, the upper edge of the slit will be focused on substantially the center of the container to be examined. Regardless of the diameter of the container, the center of the container, when properly located centrally on the supporting plate, will always appear at the same point. The lower end of the slit 13 which is adjustable, determines the radial length of the slit with respect to the bottom of the container thus for a container larger than that shown on FIG. 1, the slit 13 would be made longer by adjusting the movable plate 15 in a downward direction as viewed in FIG. 1.

By limiting the area of illumination of the container bottom to a radial slit, rotation of the container about its vertical axis through a 360° rotation will insure that the entire bottom surface of the container is illuminated without the possibility of any portion of the container being illuminated twice during any 360° rotation of the container. Thus a single defect will produce scattered reflections and will be counted as a single defect. If the slit 13 were made too large so as to illuminate more than the radius of the container bottom there is the possibility that a defect, located close to the central axis of the container, would be counted more than once during each 360° revolution of the container.

When a flaw, spike or piece of stuck glass in the bottom of the container moves through the area of illumination 20, the spike or piece of stuck glass will reflect considerable light in a scattered pattern with a portion of this scattered light being in the direction of the container opening. These reflections are observed by a photo-sensitive pick-up 23 herein illustrated as a photo-cell. The photo-sensitive pick-up 23 is positioned above the open top of the container 19 and light, reflected from a flaw or defect, will pass through a converging lens 24 which acts as a condenser. After passing through the lens 24 the reflected light will pass through an iris opening 25 and a second converging lens 26 focuses the light passing through lens 24 onto the photo-cell 23.

Figure 2:
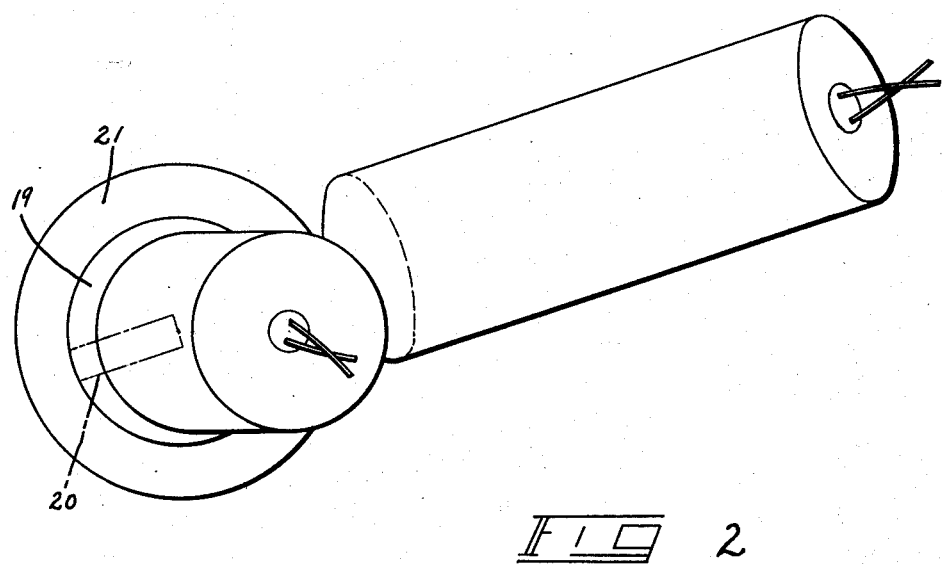
FIG. 2 is a top plan view of the apparatus of FIG. 1.

The iris 25 has the principal function of increasing the resolution of the pick-up unit and to prevent extraneous disturbing reflections from being focused on the photo-cell. As can best be seen when viewing FIG. 2, the axis of the illuminating means and the longitudinal axis of the detector are not co-planar. This is important from the standpoint that there will be some reflection from the heel portion or lower curved inner surface of the bottom of the bottle due to its contour which will be reflected upwardly. In order to avoid this reflection being viewed by the detector unit, the detector unit has its longitudinal axis oriented in a vertical plane which is at an angle to a vertical plane passing through the longitudinal axis of the illuminating device. In this manner the total reflections from the inner curved lower portion of the container will not be viewed by the detecting unit. However, if stuck glass or spikes are present in the area the incident beam striking the spike will produce scattered light and the scattered light will be sufficient to cause the detector to provide a reject signal.

Thus it can be seen that reflections from a defect in the inner bottom surface of the container will illuminate the photo-cell 23 and provide an output voltage which may be utilized to actuate a signal device or reject mechanism in the manner taught in previously mentioned Fedorchak Pat. No. 2,593,127.

While applicant has disclosed an arrangement for inspecting the bottom inner surfaces of glass containers for spikes or stuck glass wherein the illumination is beamed through the sidewall of the container and the viewing or detector device is positioned above the container, it should be pointed out that the positions of the detector and source of illumination could be reversed, however, such a reversal would be less desirable from the standpoint that the reflected light from a spike or flaw would be proportionally diminished to a greater extent by passage through the sidewall of the container and in effect, reduce the sensitivity of the device. With the particular arrangement shown the incident light from the source will be only slightly reduced by its initial passage through the sidewall of the container. The reflected light from a flaw or defect will reach the detector undiminished from the standpoint that it will not have to pass through the glass of the container but will pass through the open mouth of the container.

Various modifications may be resorted to within the spirit and scope of the appended claims.

I claim:

1. Method of inspecting the interior bottom wall surface of an open mouth container which comprises projecting a beam of radiation from a source of radiant energy, directing the beam through the sidewall of the container, focusing the beam in the form of an elongated rectangle on the said surface, said beam illuminating a full radius of said container bottom, rotating the container about its axis whereby a defect in the said surface will reflect the radiation toward the open mouth of said container, and directing said reflection passing through the open mouth of said container to a photo-cell sensitive to such radiation to produce electrical impulses, and causing the impulses to actuate a signal.

2. Method of inspecting an open mouth glass container for detecting fragments of glass or other foreign bodies or defects at the bottom wall surface of the container which method comprises illuminating a rectangular slit, projecting an image of said slit through the sidewall of the container against said surface, simultaneously causing relative motion between said image and container, placing a detecting means sensitive to such radiation in position to receive the radiation reflected from surface defects through the mouth of the container, and detecting a defect on the bottom wall surface of said container by a signal given by said detecting means and caused by bringing the defect into alignment with the image of said slit.

3. Method of inspecting the bottom wall surface of a transparent container, comprising directing a beam of radiation of elongated rectangular shape through the sidewall of said container such that one end of said beam coincides with the center of said container, and the opposite end of said beam illuminates the sidewall of said container a slight distance above the bottom wall of the container whereby a full radial portion of said container bottom wall is illuminated, viewing said illuminated strip through the open mouth of said container with a photo-sensitive device, and rotating said container about its axis through one complete rotation whereby the bottom of said container is incrementally illuminated by said illuminating strip and reflections from defects will energize said photo-sensitive device.

4. Apparatus for inspecting the interior bottom wall surface of an open mouth container comprising a source of radiation, a plate having a rectangular opening therein, means for focusing said source of radiation onto said opening, a horizontal, rotatable container support, means for focusing an image of said rectangular opening onto the inner bottom surface of a container resting on said support with the image spanning at least the full radius of the container, said source, plate and focusing means being positioned outside the container side wall in axial alignment and lying in a vertical, radial plane of the container bottom, means mounted above said container support and having its axis in alignment with the open upper end of the container for detecting radiation reflected from said bottom surface of the container.

5. Apparatus as defined in claim 4 further comprising a slidable plate mounted adjacent said first mentioned plate for masking out part of said rectangular opening, whereby the length of said opening may be adjusted to correspond to containers of different diameters.

6. Apparatus of claim 4 wherein said means for focusing the image of said opening on the container bottom will focus one end of the opening on the center of a container bottom and focus the other end of the image on the inner sidewall of the container slightly above the bottom thereof.

7. Apparatus for inspecting the inner wall bottom surface of an open mouth container comprising a source of radiation, a plate having a longitudinal opening therein, said opening being illuminated by said source of radiation, means for focusing an image of said opening through the sidewall and onto the inner bottom surface of a container, said source, plate and focusing means being in axial alignment, with the axis thereof lying in a vertical plane passing through the radius of the container bottom means mounted above said container for viewing the area of illumination on the inner bottom surface of the container through the mouth of the container, means for rotating said container about its central vertical axis, said viewing means having its longitudinal axis lying in a vertical plane which is at an acute angle to a vertical plane passing through the longitudinal axis of the source of illumination and its associated focusing means, said vertical planes intersecting at the central, vertical axis of the container.

References Cited by the Examiner

UNITED STATES PATENTS

| | | |
|---|---|---|
| 2,609,513 | 9/52 | Boucher et al. 250—224 |
| 2,649,500 | 8/53 | Fedorchak 88—14 |
| 2,735,017 | 2/56 | Beard et al. 250—52 |
| 2,750,519 | 6/56 | Summerhayes et al. 250—224 X |
| 2,753,459 | 7/56 | Fedorchak 250—52 |
| 2,868,061 | 1/59 | Fedorchak et al. 250—224 X |
| 3,069,553 | 12/62 | Zoltanski 88—14 |
| 3,081,666 | 3/63 | Calhoun et al. 88—14 |

RALPH G. NILSON, *Primary Examiner.*

ARCHIE R. BORCHELT, *Examiner.*